United States Patent
Hrdina et al.

(10) Patent No.: US 6,606,883 B2
(45) Date of Patent: Aug. 19, 2003

(54) METHOD FOR PRODUCING FUSED SILICA AND DOPED FUSED SILICA GLASS

(75) Inventors: Kenneth E. Hrdina, Horseheads, NY (US); Nikki J. Russo, Elmira, NY (US); Michael H. Wasilewski, Corning, NY (US)

(73) Assignee: Corning Incorporated, Corning, NY (US)

( * ) Notice: Subject to any disclaimer, the term of this patent is extended or adjusted under 35 U.S.C. 154(b) by 37 days.

(21) Appl. No.: 09/844,081

(22) Filed: Apr. 27, 2001

(65) Prior Publication Data

US 2002/0157420 A1 Oct. 31, 2002

(51) Int. Cl.$^7$ ............................................... C03B 19/14
(52) U.S. Cl. ........................... 65/17.4; 65/386; 65/29.19
(58) Field of Search ........................ 65/17.4, 386, 421, 65/422, 29.19

(56) References Cited

U.S. PATENT DOCUMENTS

| | | | | |
|---|---|---|---|---|
| 5,043,002 | A | * 8/1991 | Dobbins et al. | 65/17.4 |
| 5,106,401 | A | 4/1992 | Ishikawa et al. | |
| 5,152,819 | A | * 10/1992 | Blackwell et al. | 65/17.4 |
| 5,679,125 | A | 10/1997 | Hiraiwa et al. | |
| 5,696,038 | A | * 12/1997 | Maxon | 65/17.4 |
| 5,922,100 | A | * 7/1999 | Cain et al. | 65/531 |
| 6,265,115 | B1 | 7/2001 | Berkey et al. | |
| 6,328,807 | B1 | * 12/2001 | Boek et al. | 118/724 |

FOREIGN PATENT DOCUMENTS

| | | | | |
|---|---|---|---|---|
| JP | 59-92936 | * 5/1984 | | |
| JP | P2001-19450 A | 1/2001 | | C03B/20/00 |
| WO | WO98/27018 | 6/1998 | | |
| WO | 98/27018 | 6/1998 | | C03B/19/14 |
| WO | WO01/08163 A1 | 2/2001 | | |
| WO | WO02/14230 A1 | 2/2002 | | |

OTHER PUBLICATIONS

Abstract of JP59092936, May 1984.*
U.S. Ser. No. 09/639,405, filed Aug. 15, 2000, entitled Flame Hydrolysis Deposition Process For Making Integrated Optical Components, of Boek et al., 22 pages/12 drawings.
U.S. Ser. No. 09/638,786, filed Aug. 15, 2000, entitled Flame Polishing of Layers For Planar Devices, of Boylan et al., 15 pages/11 drawings.

* cited by examiner

Primary Examiner—James Derrington
(74) Attorney, Agent, or Firm—Adenike A. Adewuya

(57) ABSTRACT

A method for forming a fused silica glass includes delivering a silica precursor to a burner and passing the silica precursor through the flame of the burner to form silica particles, depositing the silica particles on a planar surface to form a flat, porous preform, dehydrating the porous preform, and consolidating the porous preform into a flat, dense glass.

12 Claims, 2 Drawing Sheets

METHOD FOR PRODUCING FUSED SILICA AND DOPED FUSED SILICA GLASS

BACKGROUND OF THE INVENTION

1. Field of the Invention

The invention relates generally to a method for producing high purity fused silica and doped fused silica soot blanks (or preforms) by thermal decomposition of precursors and deposition of the resulting oxides.

2. Background Art

High purity fused silica finds many diverse applications, e.g., as optical lenses for infrared transmission or as stepper lenses for deep-ultraviolet (UV) microlithography systems. However, a high purity fused silica having high water content is unsuitable for infrared transmission because water has some absorption at these wavelengths. Also, high purity fused silica has a small positive coefficient of thermal expansion ("CTE") which makes it unsuitable for applications such as extreme ultraviolet lithography ("EUVL"). For example, if high purity fused silica is used as a mask blank for EUVL, heating of the mask blank as a result of absorption would cause the mask blank to expand. Such expansion will result in distortion and pattern placement errors at the wafer. This is a serious issue when using EUVL to print features at the sub-100-nm scale. For applications such as EUVL, doped glass is preferred. In particular, $TiO_2$-doped fused silica can be made to have a lower CTE than pure fused silica with the potential for a CTE that approximates zero.

Production of high purity fused silica or $TiO_2$-doped fused silica generally involves transporting a silica precursor or a mixture of a silica precursor and a titania precursor to a reaction site, thermally decomposing the precursors, and depositing the resulting silica particles or $TiO_2$-doped silica particles ("soot") on a support. The precursors may be in vapor form or may be vaporized and carried to the reaction site by a carrier gas. Originally, chlorides of silicon and titanium were employed as precursors. Recently, for environmental reasons, chloride-free precursors such as a siloxane, e.g., octamethylcyclotetrasiloxane (OMCTS), and a titanium alkoxide, e.g., titanium isopropoxide $Ti(OPri)_4$, have been commercially employed. In the conventional boule process, the soot is continuously deposited, for example, in a cup of a refractory furnace where it melts to form a solid body ("boule"). Such boules may be used individually, may be finished and integrated together into large optical bodies, or may be cut into small pieces for finishing as lenses and the like. It is also possible to consolidate the soot into a solid body in a separate step.

Usage of organic precursors and a hydrogen-containing fuel in producing the soot inherently results in the fused silica containing more water than can be tolerated by infrared transmission applications or deep-UV applications such as at 157 nm. Another suspected problem is non-uniform deposition reactions during decomposition of the organic precursors at temperatures required to form the boule (typically 1500° C. to 1900° C.). For $TiO_2$-doped fused silica in particular, the non-uniform reactions may result in large variations in the CTE of the glass. EUVL requires mask blanks with low variations in the CTE (e.g., 0±5 ppb/° C.).

SUMMARY OF THE INVENTION

In one aspect, the invention relates to a method for forming a fused silica glass. The method comprises delivering a silica precursor to a burner and passing the silica precursor through the flame of the burner to form silica particles and depositing the silica particles on a planar surface to form a flat, porous preform. The method further includes dehydrating the porous preform and consolidating the porous preform into a flat, dense glass.

In another aspect, the invention relates to a method for forming fused silica glass having a low water content. The method comprises delivering a silica precursor to a burner and passing the silica precursor through the flame of the burner to form silica particles and depositing the silica particles on a planar surface to form a flat, porous preform while maintaining the temperature of the planar surface in a range from approximately 600 to 900° C. The method further includes dehydrating the porous preform and consolidating the porous preform into a flat, dense glass having an OH content below 1 ppm.

In another aspect, the invention relates to a method for producing a fused silica glass containing titania. The method comprises delivering a mixture of a silica precursor and a titania precursor to a burner and passing the mixture through the flame of the burner to form $SiO_2$—$TiO_2$ particles and depositing the $SiO_2$—$TiO_2$ particles on a planar surface to form a flat, porous preform. The method further includes consolidating the porous preform into a flat, dense glass.

Other aspects and advantages of the invention will be apparent from the following description and the appended claims.

DETAILED DESCRIPTION OF THE INVENTION

Embodiments of the invention provide a planar soot deposition method for forming a flat soot preform. In general, the method involves injecting precursors in vapor or liquid form into one or more burners. The precursors exit the burners where they react to form soot. The soot collects on a planar surface to form a flat porous preform. The processing temperatures are typically in a range from 600 to 900° C., and more preferably in a range from 700 to 800° C. The planar soot deposition method can be used to produce a fused silica preform, which can then be subsequently dried by such methods as chlorine and/or fluorine calcining and consolidated into a clear, water-free glass flat plate. Using this method, fused silica glass having OH content of less than 1 ppm can be formed. The planar soot deposition method can also be used to produce a $TiO_2$-doped fused silica preform with low variations in the CTE. The $TiO_2$-doped fused silica preform is consolidated in a separate step. The $TiO_2$doped fused silica may or may not be dried prior to the consolidation step.

Figure 1:
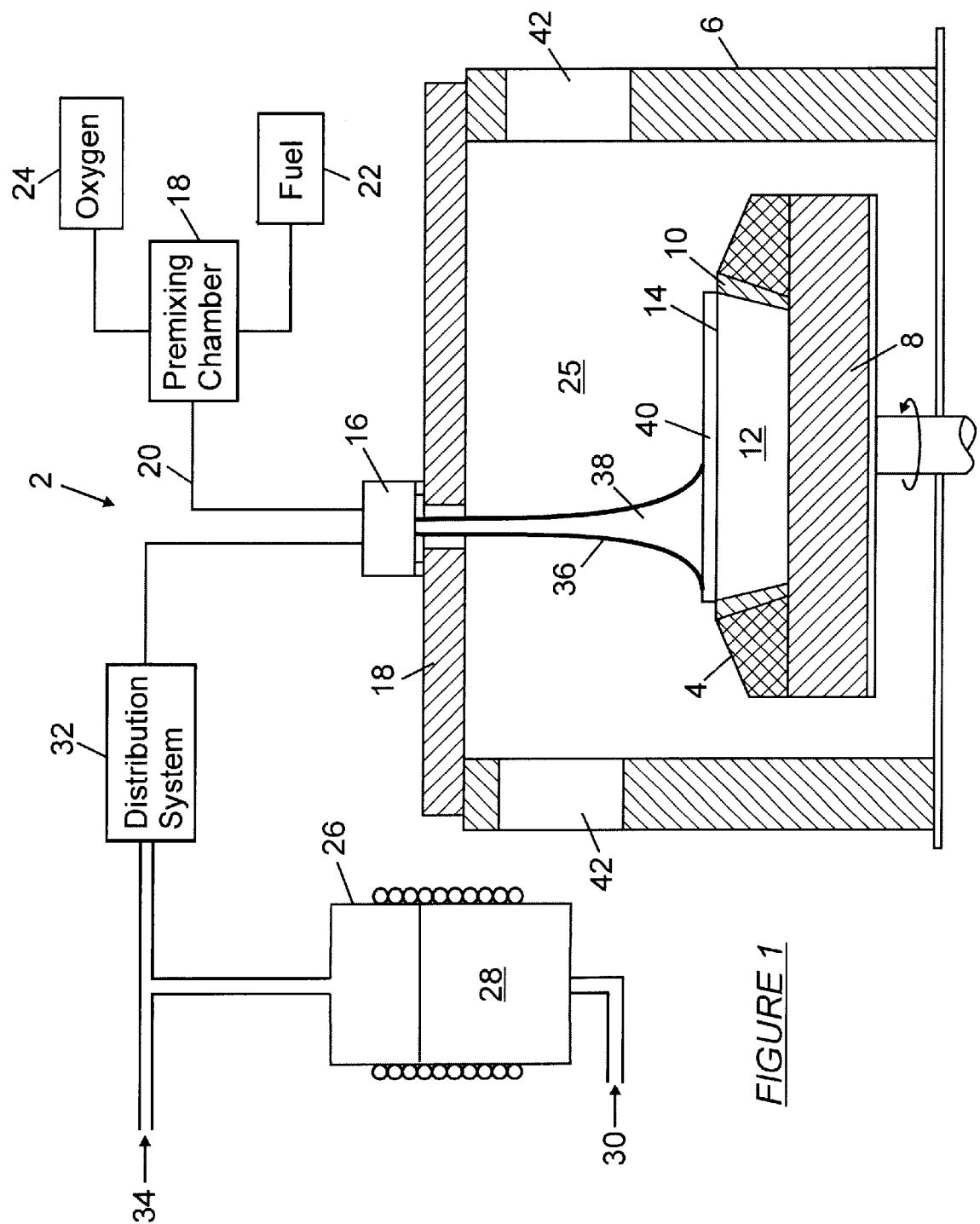
FIG. 1 is a schematic representation of a system for forming a soot preform according to one embodiment of the invention.

Various embodiments of the invention will now be described with reference to the accompanying drawings. FIG. 1 is a schematic representation of a system, generally designated at 2, for use in practicing the invention. The system 2 includes a containment vessel 4 mounted inside a furnace 6. The containment vessel 4 is made of refractory materials. The base 8 of the containment vessel 4 is rotatably supported within the furnace 6. The liner 10 of the containment vessel 4 is filled to the top with crushed and cleaned glass or cutlet 12. In one embodiment, the cutlet 12 provides a planar surface 14 on which soot can be deposited. In alternate embodiments, other means of providing a planar surface 14 for soot deposition may be used. For example, a planar substrate made of high purity fused silica or quartz or other suitable material can be supported in the furnace 6 and used to collect soot. Furthermore, the planar surface 14 can have any desired shape, e.g., circular, rectangular, etc.

The system 2 further includes a burner 16 mounted on the furnace crown 18. The burner 16 may be any of the standard or precision burners used in conventional flame hydrolysis processes. U.S. Pat. No. 5,922,100 issued to Cain et al., assigned to Corning, Incorporated, discloses examples of premixed, natural gas burners that may be used in the process. However, the invention is not limited to the burners disclosed in the Cain et al. patent. The burner 16 is connected to a premixing chamber 18 by fume line 20. Fuel 22 and oxygen 24 are mixed in the premixing chamber 18 and then transferred to the burner 16 through fume line 20. The fuel 22 may be hydrogen, methane, carbon monoxide, or other fuel, and the oxygen 24 may be in its pure state or may be admixed with inert gases such as nitrogen, argon, helium, or carbon dioxide. The burner 16 ignites the fuel/oxygen mixture to produce a flame which typically preheats the deposition cavity 25 to a desired temperature. It is not necessary, however, to preheat the deposition cavity 25. Multiple burners 16 may be used to both achieve better heat control and a more uniform deposition pattern across the deposition cavity 25.

The system 2 further includes a source 26 of a silica precursor 28. The silica precursor 28 may be, for example, a siloxane such as OMCTS, although other organic or inorganic silica precursors, e.g., $SiCl_4$ and $SiH_4$, can also be used. U.S. Pat. No. 5,043,002 issued to Dobbins et al. and U.S. Pat. No. 5,152,819 issued to Blackwell et al., both assigned to Corning Incorporated, give a list of silica precursors that can be used in the process. In general, halogen-free precursors are preferred because they are more environmentally friendly. $SiH_4$ exists in vapor form at room temperature. The silica precursor 28 is supplied to the source 26 at a predetermined flow rate. In one embodiment, the source 26 is a vaporizer, an evaporation tank, or other equipment necessary to convert the silica precursor 28 into vapor form. An inert carrier gas 30, e.g., nitrogen, carries the silica precursor 28 vapors through a distribution system 32 to the burner 16. A stream of inert gas 34, e.g., nitrogen, is brought into contact with the silica precursor 26 vapors to prevent saturation. In an alternate embodiment, the silica precursor 28 may be delivered to the reaction site in liquid form.

The silica precursor 28 vapors are hydrolyzed or decomposed by heat at the burner 16. The hydrolyzed or decomposed vapors pass through the flame 36 where they are converted into fine silica particles. The soot stream 38 is directed downwardly and deposited on the planar surface 14 in the form of a flat porous preform 40. The planar surface 14 is rotated as the soot preform 40 is formed. Spurious soot formed during deposition is removed via draft ports 42 which are connected to an exhaust system (not shown). The furnace 6 is drafted using ambient air flows, which may be filtered if desired. The temperature of the deposition cavity 25 is monitored with an optical pyrometer, which measures the temperature of the furnace crown 18. The temperature of the planar surface 14 is typically in a range from 600 to 900° C. Preferably, the temperature of the planar surface 14 is in a range from 700 to 800° C. The temperature of the planar surface 14 is controlled by adjusting the vertical position of containment vessel 4. The pressure in the deposition cavity 25 is controlled by adjusting furnace draft through changes to either the exhaust fan speed and/or shield position at the draft ports 42. The furnace is usually operated with a cavity pressure slightly less than ambient pressures.

After a desired thickness of the soot preform 40 is reached, the soot deposition process is shut down. No known limit on preform size is known. 38-cm diameter soot preform and larger have been formed using the process. After deposition, the soot preform 40 is dried, e.g., by chlorine and/or fluorine calcining. Calcining involves heating the soot preform 40 in a chamber (not shown) and introducing a mixture of chlorine and/or fluorine and an inert gas into the chamber. The chlorine and/or fluorine treatment will generally be best at temperatures just prior to consolidation of the structure. The high temperatures allow reaction of metal impurities to form volatile metal chlorides which are removed. Additionally, the chlorine removes OH from the glass structure. Open pores are necessary for the gases to penetrate into the interior of the part. The preform could also be doped by other gases at this time such as fluorine which may benefit infrared transmission and deep-UV applications at 157 nm. Fluorine gas could be used either in addition to chlorine gas or instead of chlorine gas. After the drying process, the preform is fully consolidated into dense glass.

Figure 2:
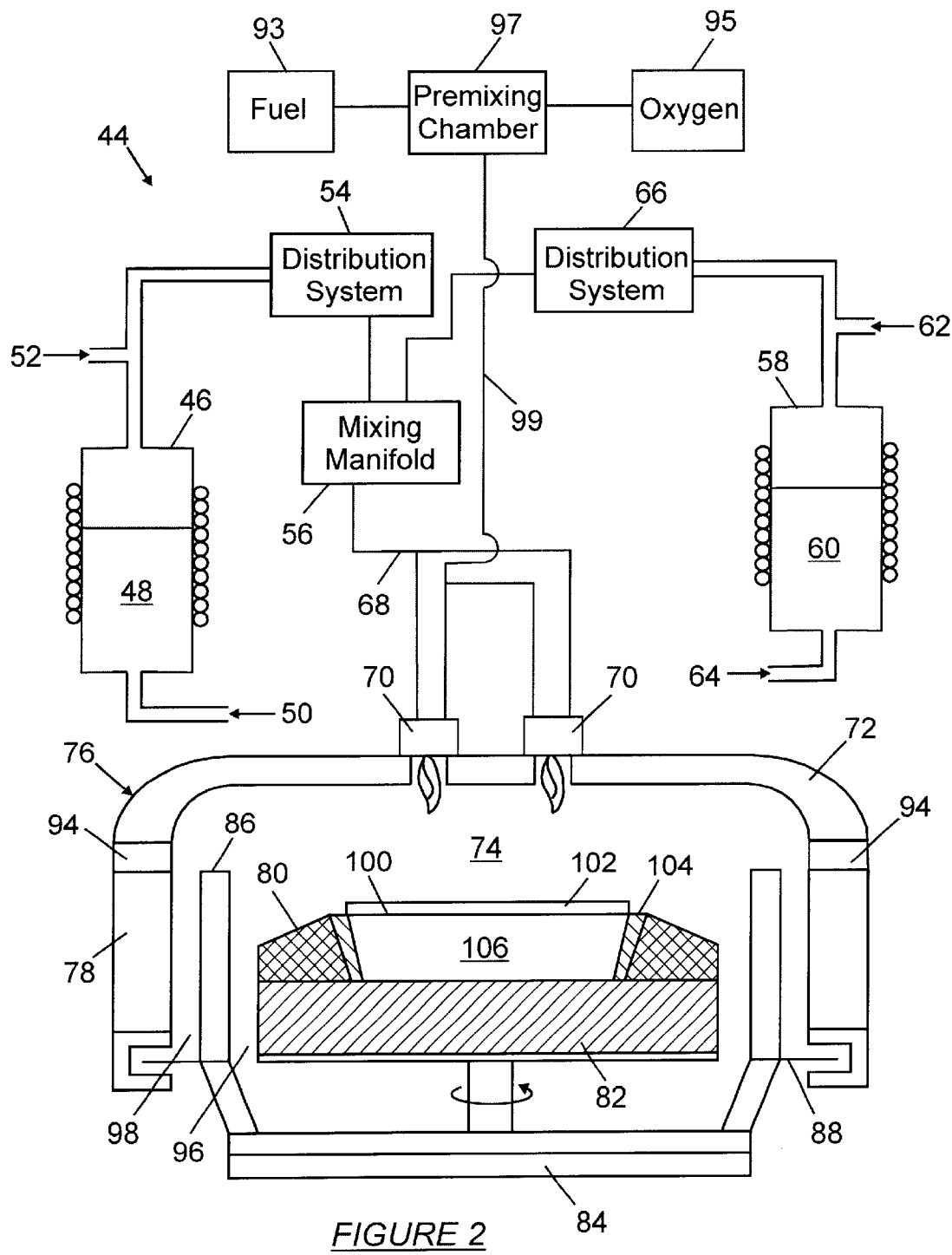
FIG. 2 is a schematic representation of a system for forming a $TiO_2$-doped silica soot preform according to another embodiment of the invention.

Production of $TiO_2$-doped, fused silica soot preform using the planar soot deposition method is similar to the one described above for high purity fused silica soot preform, except that two delivery systems are needed for the silica precursor and titania precursor. FIG. 2 is a schematic representation of a system, generally designated as 44, for producing a $TiO_2$doped fused silica soot preform using the planar soot deposition method of the invention. The system 44 includes a source 46 of a silica precursor 48. As previously discussed, the silica precursor 48 could be OMCTS, $SiCl_4$, $SiH_4$, or any other suitable material. $SiH_4$ exists in vapor form at room temperature. In one embodiment, the source 46 is a vaporizer, evaporation tank, or other equipment suitable for converting the silica precursor 48 into vapor form. A carrier gas 50, such as nitrogen, is introduced at or near the base of source 46. The carrier gas 50 entrains the vapors of the silica precursor 48 and passes through a distribution system 54 to a mixing manifold 56. A by-pass stream of carrier gas is introduced at 52 to prevent saturation of the vaporous stream. In an alternate embodiment, the vaporization step may be eliminated and the silica precursor 48 may be delivered to the mixing manifold 56 in liquid form.

The system 44 further includes a source 58 of the titania precursor 60, e.g., a titanium alkoxide such as titanium isopropoxide ($Ti(OPri)_4$). The source 58 may convert the titania precursor 60 into vapor form if the titania precursor 60 is not already in vapor form. A stream of inert gas 62, e.g., nitrogen, can be brought into contact with the vaporous titania precursor to prevent saturation of the vapors. An inert carrier gas 64, e.g., nitrogen, entrains the titania precursor 60 vapors and carries the vapors through a distribution system 66 to the mixing manifold 56, where they are mixed with the silica precursor 48 vapors. The mixture passes through heated fume lines 68 to the burners 70 mounted on the furnace crown 72. In this illustration, two burners 70 are shown. Alternatively, the titania precursor 60 may be delivered to the mixing manifold 56 in liquid form. However, more than two burners can be used to allow for better heat control and distribution of material across the deposition cavity 74. One example of a burner that can be used in the process is Canton ULE burner.

The furnace 76 shown in this illustration has rotation and oscillation capabilities. This type of furnace can also be used in the system described in FIG. 1. The furnace 76 includes a stationary wall 78, which supports the crown 72. A containment vessel 80 is disposed within the stationary wall 78. The containment vessel 80 includes a base 82 which is rotatably supported and which also oscillates through its attachment to an oscillation table 84. The containment vessel 80 is surrounded by an air flow wall 86 which is mounted on the oscillation table 84. A motion accommodating seal 88 is formed between the stationary wall 78 and the containment vessel 80. The deposition cavity 74 is vented by draft ports 94 formed at the top of the stationary wall 78. The draft ports 94 are connected to a suitable exhaust system (not shown) by ducting which creates a negative pressure in the deposition cavity 74 with respect to ambient pressure.

Fuel 93 and oxygen 95 are premixed in the premixing chamber 97 and then transferred to the burners 70 through fume lines 99. The burners 70 ignite the fuel/oxygen mixture to produce a flame which heats the deposition cavity 74. The vaporous reactants injected into the burners 70 exit the burners 70 where they react and form $TiO_2$-doped silica particles via flame hydrolysis or pyrolysis. The soot is directed downwardly and deposited on a planar surface 100 in the form of a flat porous preform 102. As in the illustration shown in FIG. 1, the planar surface 100 is provided by filling the liner 104 of the containment vessel 80 with cleaned cullet 106, although other means of providing a planar surface, such as a glass plate, may also be used. As the soot preform 102 is formed, the containment vessel 80, and hence the planar surface 100, is rotated and oscillated through the base 82 to improve index homogeneity of the silica. U.S. Pat. No. 5,696,036 issued to Maxon, assigned to Corning, Incorporated, discloses examples of oscillation patterns suitable for use in the process.

During soot deposition, the furnace 76 is draft with ambient air flows, which can be filtered if desired. The temperature of the deposition cavity 74 is monitored and held at desired processing temperatures, typically in a range from 500 to 900° C., by adjusting the vertical position of the containment vessel 80. Non-uniform reactions which result in large variations in the CTE of the glass are minimized by keeping the processing temperatures below that which is required for full consolidation of the soot preform 102. The pressure in the deposition cavity 74 is controlled by adjusting the furnace draft. After soot deposition, the soot preform 102 is removed into a chamber (not shown) to await consolidation. The soot preform 102 is fully consolidated into non-porous glass by heating to consolidation temperatures (typically 1100° C. to 1800° C.). If desired, the soot preform 102 may be dried, e.g., by chlorine and/or fluorine calcining, prior to consolidation. The consolidated glass typically contains 2% to 12% by weight titania.

The following examples further illustrate embodiments of the invention and are not intended to limit the scope of the invention as otherwise described herein.

EXAMPLE 1

An 11" diameter by 1.75" thick soot preform was formed using OMCTS as the silica precursor. In this example, four burners were used and the planar surface on which the soot preform is formed was not oscillated during deposition. The gas flows, ie., OMCTS flow, oxygen flow, and fuel flow, were set to approximately half of that of a normal run for making fused silica glass. The gas flows were established after the OMCTS flow was started. Each burner gas flow was adjusted to deliver enough heat to partially consolidate but not fuse the soot. The total deposition time was approximately 6 hours. The soot preform was dense enough (estimated to be 40% dense) to be easily handled. The center area of the preform (about 1" diameter) was quite soft, indicating a cooler temperature.

To dry the soot preform by chlorine calcining, the soot preform was placed in a chamber, and the pressure in the chamber was lowered to about 1 torr. At this pressure, the chamber was heated at about 40° C./hr to 1000° C. Then, chlorine/helium mixture was introduced into the chamber at about 3:1 ratio till the pressure in the chamber reached about 500 torr. At this time, the chlorine/helium flow was shut off, and the system was depressurized to about 1 torr. This chlorine treatment took approximately 2 hours. The chlorine treatment was repeated 5 more times. Then, under vacuum, the system was heated at about 1.5° C./min to about 1300° C., and then cooled to room temperature. At this time, the chlorine-treated preform was consolidated, but not transparent.

To fully consolidate the preform, the preform was heated at 30° C./min under vacuum to 1500° C. and held at this temperature for 10 minutes. The pressure was then increased to 70 psi and heated at 30° C./min to 1760° C. and held at this temperature for 20 minutes before cooling to room temperature. The preform was transparent upon removal. The β-OH content of this glass was below detectible limit of less than ⅛" ppm.

EXAMPLE 2

An 11" diameter by 1.75" thick soot preform was formed as described in Example 1. To dry the soot preform by chlorine calcining, the soot preform was placed in a chamber, and the pressure in the chamber was lowered to about 1 torr. The chamber was then heated at about 75° C./hr to 1000° C. Chlorine/helium mixture was introduced into the chamber at about 3:1 ratio till the pressure in the chamber reached about 500 torr. At this time, the chlorine/helium flow was shut off, and the system was depressurized to about 1 torr. This chlorine treatment took approximately 2 hours in time. The chlorine treatment was repeated 5 more times. Then, under vacuum, the system was heated at about 5° C./min to about 1400° C. and then cooled to room temperature. The resultant preform was consolidated and transparent. The P-OH content of this glass was below detectible limit of less than ⅛" ppm OH.

The follow examples further illustrate embodiments of the invention and are not intended to limit the scope of the invention as otherwise described herein

EXAMPLE 3

A 14" diameter soot preform composed of silica and titania was formed using the planar soot deposition method described above. The thickness of the soot preform was approximately 1 ½" The soot was deposited on top of a bed of quartz granules within a four-burner furnace that had rotation and oscillation capabilities. The size of the substrate was about 14" in diameter. The preform was dense enough to be easily handled. The center was quite soft, indicating a cooler temperature.

To consolidate the preform, the preform was placed in a chamber, and the pressure in the chamber was lowered to about 1 torr. The preform was then heated at about 2.5° C./min to 1300° C. and held at this temperature for 20 minutes. The preform was then cooled. The resultant preform was completely consolidated. The consolidated preform was blue in color, presumably from some reduced titania. The CTE variations in this glass was approximately 1 ppb/° C.

EXAMPLE 4

A 14" diameter soot preform composed of silica and titania was formed using the planar soot deposition method described above. The thickness of the soot preform was approximately 1 ½". The soot was deposited on top of a ground quartz bed within a four-burner furnace that had rotation and oscillation capabilities. The size of the substrate was 14" in diameter and ¼" thick. The preform was dense enough to be easily handled. The center was quite soft, indicating a cooler temperature. The soot preform was dried by chlorine calcining and then fully consolidated.

To dry the soot preform by chlorine calcining, the preform was placed in a chamber. The pressure in the chamber was lowered to about 1 torr, and the chamber was heated at about 2.5° C./min to 825° C. and held at this temperature. The lower temperature was used to prevent pore closure during gas/heat treatment. Open pores are needed for gases to penetrate the sample while chlorine enters the chamber. The open pores also allow gases to vent when the system is depressurized. Chlorine/helium mixture was introduced into the chamber in about 3:1 ratio till the pressure in the chamber reached about 500 torr. At this time, the chlorine/helium flows were shut off and the system was depressurized to about 1 torr. This chlorine treatment cycle took approximately 2 hours in time. This chlorine treatment was repeated 5 more times. Then, under vacuum, the system was heated at about 5° C./min to about 1300° C. and then cooled to room temperature. The resultant sample was consolidated and fully dense. This sample appeared black in color.

Chlorine treatment of the preforms is generally best at temperatures just prior to consolidation of the preform. Also, fluorine could be used as a dehydrating agent either in addition to chlorine or instead of chlorine. Other dopants may be added, if desired, during the chlorine treatment.

The invention provides general advantages. A flat preform can be made using the process of the invention for the purpose of drying by chlorine (or fluorine or chlorine/fluorine) calcining and consolidation into a clear, water-free glass flat plate. Also, a $TiO_2$-doped preform can be made for the purpose of making a low-expansion glass. The result is a $TiO_2$-doped preform which has low variations in CTE within the substrate.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forming a fused silica glass, comprising:
   delivering a silica precursor to a burner and passing the silica precursor through the flame of the burner to form silica particles;
   depositing the silica particles on a planar surface to form a flat, porous preform, wherein the temperature of the planar surface is maintained in a range from approximately 600 to 900° C.;
   dehydrating the porous preform; and
   consolidating the porous preform into a flat, dense glass.

2. The method of claim 1, wherein the temperature of the planar surface is maintained in a range from approximately 700 to 800° C.

3. The method of claim 1, wherein the glass has an OH content below 1 ppm.

4. The method of claim 1, wherein dehydrating the porous preform comprises exposing the porous preform to a heated, halide-containing atmosphere and subsequently cooling the porous preform.

5. The method of claim 4, wherein the temperature of the heated, halide-containing atmosphere is below that required to fully consolidate the porous preform into dense glass.

6. The method of claim 4, wherein the halide-containing atmosphere comprises chlorine.

7. The method of claim 4, wherein the halide-containing atmosphere comprises fluorine.

8. The method of claim 4, wherein the halide-containing atmosphere comprises a mixture of chlorine and fluorine.

9. A method for forming a fused silica glass having a low water content, comprising:
   delivering a silica precursor to a burner and passing the silica precursor through the flame of the burner to form to silica particles;
   depositing the silica particles on a planar surface to form a flat, porous preform while maintaining the temperature of the planar surface in a range from approximately 600 to 900° C.;
   dehydrating the porous preform; and
   consolidating the porous preform into a flat, dense glass having an OH content below 1 ppm.

10. A method for producing a fused silica glass containing titania, comprising:
    delivering a mixture of a silica precursor and a titania precursor to a burner and passing the mixture through the flame of the burner to form $SiO_2$—$TiO_2$ particles;
    depositing the $SiO_2$—$TiO_2$ particles on a planar surface to form a flat, porous preform, wherein the temperature of the planar surface is maintained in a range from approximately 500 to 900° C.; and
    consolidating the porous preform into a flat, dense glass.

11. The method of claim 10, wherein the temperature of the planar surface is maintained in a range from approximately 700 to 800° C.

12. The method of claim 10, further comprising dehydrating the shoot preform prior to consolidation.

* * * * *